Figure 1:
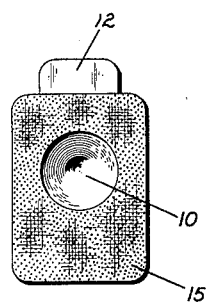

Dec. 12, 1950  J. E. MOE  2,534,203
PICKER
Filed June 17, 1947

Inventor
J. Edgar Moe
by James R. Hodder
Attorney

Patented Dec. 12, 1950

2,534,203

UNITED STATES PATENT OFFICE 2,534,203

PICKER

J. Edgar Moe, Danielson, Conn., assignor to The Bullard Clark Company, Danielson, Conn., a corporation of Connecticut Application June 17, 1947, Serial No. 755,189

4 Claims. (Cl. 139—159)

My present invention is a novel and improved picker for use on picker sticks in looms, and includes a novel combination of different materials and a method of making the picker therefrom.

Heretofore, it has been customary to make pickers, to fit the picker sticks, of leather, rubber, fibers, canvas, and various combinations of the same; but all such prior pickers have been unsatisfactory in wear, of short life, and expensive to assemble. Such pickers are subjected to very great strain, shock, and wear, as they necessarily receive the impact of a shuttle when thrown from one side of the loom to the other, and also impart the power to the shuttle to return it across the width of the loom.

These shuttles have steel or metal points and are of considerable weight and, furthermore, are uncontrolled in flight and, hence, are apt to strike the picker with disaligned force, frequently wearing the picker off on one side more than the other and breaking the same, or the loop which surrounds the picker stick.

Recently efforts have been made to utilize synthetic plastic material as a picker, molding the same under heat and pressure, and forming both the plug and the loop portion of such plastic. Such prior devices, however, have been unsatisfactory as the expense involved is considerable, and the plastic material would wear unevenly and break. Various other efforts of reinforcing pickers have been attempted, such for example as my prior Patent No. 2,313,354 of March 5, 1943, and No. 2,341,904 of Feb. 15, 1944, to B. T. Clark.

It is an object of my present invention to obviate the difficulties heretofore experienced in picker construction and to manufacture a picker having, in combination, a mass of synthetic plastic material for the shuttle-receiving and shock-resisting portion, together with a resilient element for the loop portion, preferably of a plurality of layers of impregnated textile tape material. Said layers also enclose the synthetic plastic plug portion in a strong, firm, and wear-resisting construction. The tape element may be treated with suitable adhesive or a rubber compound and either vulcanizable or non-vulcanizable, being molded under heat and pressure into a homogeneous mass, together with the plug element of suitable synthetic plastic whereby the entire picker has a hard, tough, shuttle-receiving face and a tough, strong, resilient loop-engaging portion, which also aids in giving a slight desired resiliency to the shuttle-receiving shock and, thus, preserves the entire picker from undue wear.

While I prefer to utilize impregnated tape as above noted, I may also employ as the resilient loop-forming and plug-enclosing element a mass of rubber or rubber reinforced with fibers, textile, or other material. Thus, my invention, broadly considered, consists in the combination of a molded synthetic plastic and a resilient loop-forming and plastic-enclosing element or elements.

A further feature consists in my present construction whereby the synthetic plastic material and the layers of impregnated tape are so combined as to effect an interlocking action therebetween, as well also as an interlocking and bracing construction between the synthetic plastic and the picker stick on which the picker is mounted, thus tending to prevent wobbling or disalignment of the picker stick during the shock of shuttle-receiving as well as acting to insure more direct power transmission from the picker stick thru the picker to the shuttle when thrown across the loom.

For this purpose, I so design, construct, and arrange the synthetic plastic element to slightly straddle the width of the picker stick while enclosing the plastic and enveloping the same with the resilient tape element and producing a shock-absorbent layer, or layers, between the plastic and the picker stick.

Thus my present improved construction enables the shuttle-receiving plug to be backed up by the picker stick and, in effect, to be interlocked therewith thru a layer of the resilient material.

In carrying out my invention, I provide a molded mass of tough, wear-resisting synthetic plastic material, forming the same as and for the shuttle-receiving portion or plug element in the face of the picker. Preferably, this material is molded into a sufficiently solid mass to receive the metal point of the shuttle and for this purpose I form a shuttle-receiving recess in the center of the face, this being customary in pickers of this type.

I also form or mold the synthetic plastic with a rearwardly extending pair of ribs which are intended to straddle or slightly overlap the picker stick to which the picker is to be attached, extending these ribs slightly into the loop portion. I find that various synthetic plastics are suitable for this plug element, particularly the synthetic linear polyamide commercially manufactured under the name of nylon made by the Du Pont Company, which is a satisfactory and efficient synthetic plastic and can be molded or extruded into the novel form of my plug construction, or other materials such as Bakelite can be utilized for this purpose.

I then prepare a mass of textile material in the form of tape impregnated or coated with rubber, or other adhesive, either vulcanizable or non-vulcanizable, which tape is wrapped firmly under tension around both the plug element and a suitable form to simulate the picker stick of the size and taper for which the picker is designed. Such tape also encloses the sides and face of the plug element, as well as the rearwardly projecting ribs and constitutes the loop element of the combined picker. A plurality of layers of tape is thus wound around: First around the form to make the loop, and then around the plug, thus giving a strong, united construction and, thereafter, the entire tape and plug are subjected to heat and molding pressure sufficient to solidify the same into a strong, firm, interlocked mass.

Figure 2:
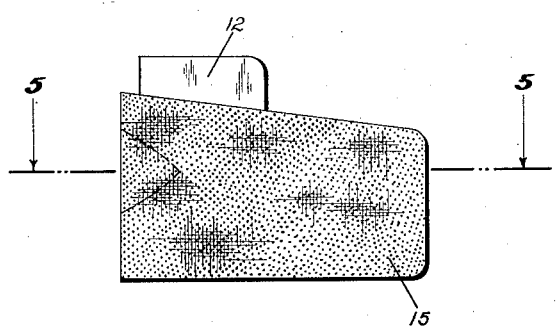
Figure 3:
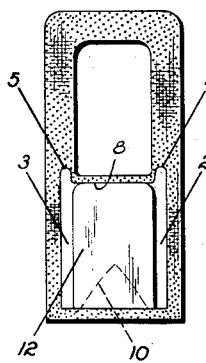
Figure 4:
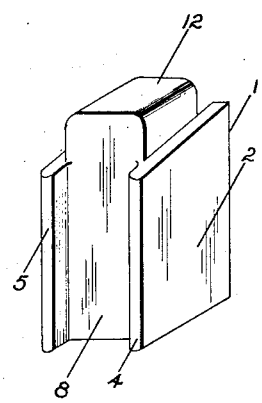
Figure 5:
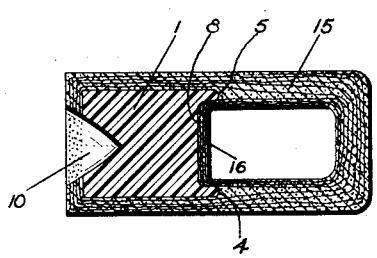

As shown in the drawings:

Fig. 1 is a front view of my improved picker;
Fig. 2 is a side view;
Fig. 3 is a top plan view;
Fig. 4 is a view in perspective of the synthetic plastic plug showing the ribs, and
Fig. 5 is a cross-sectional view on the line 5—5 of Fig. 2.

Referring to the drawings, the plastic element comprises a plug or block designated generally at 1, preferably, in rectangular form, with parallel sides 2 and 3, which sides extend rearwardly into ribs 4 and 5, respectively. These constitute the main portion of the plug with the rear of the plug 8 formed flat or partaking of the taper of the loop and with a conical recess 10 formed, or to be formed, in the face of the plug to receive the point of the shuttle. Preferably, also, an extension 12 is provided which may be either upstanding or depending to give a balanced construction to the plug and to have the conical recess 10 located centrally of the striking face of the plug. The impregnated tape is designated at 15 and is wound, first, around the form which constitutes the loop and thus gives a mass of material of this impregnated tape, as indicated at 16, between the rear face 8 of the plug and the loop portion.

The rest of the layers of tape are then wound across the face of the plug and around the loop until a multiplicity of layers are thus built up in superimposed relation, wherein heat and pressure is applied to the same and the layers and plug are thus solidified by a molding operation. Thereafter, the trimming may be effected to enable a picker to fit the tape, size, style of loom, and shuttle box, and the conical recess 10 formed thru the tape layers in the face and, preferably, also at this time, the conical recess would be formed in the face of the plug 1.

Thus, my completed picker construction combines the use of a suitable synthetic plastic material for the shuttle-receiving element, together with a cushioning element between it and the picker and with the overlapping or extending ribs 4 and 5 embedded in the encircling impregnated tape to fit over and straddle the picker stick, preserving the alignment of the plug and of the shuttle recess 10.

I claim:

1. As a new article of manufacture, a picker of the kind described having a shuttle-contacting portion and a loop portion formed of synthetic plastic material at the shuttle-contacting portion and extending ribs opposite said face, in combination with resilient material forming the loop and enclosing said synthetic plastic and interlocking with said ribs.

2. As a new article of manufacture, a picker of the kind described having a shuttle-contacting portion and a loop portion formed with molded nylon for the shuttle-contacting face portion, and a plurality of layers of adhesively impregnated textile material forming the loop and enclosing the nylon portion, said plastic having rearwardly extending ribs opposite said face portion and projecting into the loop-forming portion.

3. As a new article of manufacture, a picker of the kind described having a shuttle-contacting portion and a loop portion, having a mass of molded synthetic plastic, in combination with resilient material forming the loop of the picker, and means interlocking the plastic with the loop portion by extending ribs spaced wider than the loop opening.

4. As a new article of manufacture, a picker of the kind described, having a loop and a preformed mass of wear-resisting material constituting the shuttle-receiving face of the picker, a plurality of layers of adhesively impregnated textile material forming said loop and uniting said molded mass to the loop formed by the layers, and interlocking ribs embedded in the textile layers to prevent disalignment of the molded mass relatively with the loop portion during use.

J. EDGAR MOE.

REFERENCES CITED

The following references are of record in the file of this patent:

UNITED STATES PATENTS

| Number | Name | Date |
|---|---|---|
| 649,698 | Lahue | May 15, 1900 |
| 1,397,475 | West | Nov. 15, 1921 |
| 2,219,380 | Chandler | Oct. 29, 1940 |
| 2,341,904 | Clark | Feb. 15, 1944 |